(12) United States Patent
Hsu

(10) Patent No.: US 8,666,389 B2
(45) Date of Patent: Mar. 4, 2014

(54) METHOD OF HANDLING SYSTEM INFORMATION RECEPTION WITH MEASUREMENT GAP CONFIGURATION AND RELATED COMMUNICATION DEVICE

(75) Inventor: Chia-Chun Hsu, Taoyuan County (TW)

(73) Assignee: HTC Corporation, Taoyuan, Taouan County (TW)

( * ) Notice: Subject to any disclaimer, the term of this patent is extended or adjusted under 35 U.S.C. 154(b) by 338 days.

(21) Appl. No.: 12/849,818

(22) Filed: Aug. 4, 2010

(65) Prior Publication Data

US 2011/0034165 A1    Feb. 10, 2011

Related U.S. Application Data

(60) Provisional application No. 61/231,325, filed on Aug. 5, 2009.

(51) Int. Cl.
*H04W 24/00* (2009.01)

(52) U.S. Cl.
USPC .......................................................... 455/423

(58) Field of Classification Search
None
See application file for complete search history.

(56) References Cited

U.S. PATENT DOCUMENTS

| | | | |
|---|---|---|---|
| 2007/0207824 A1 | 9/2007 | Bhattacharjee | |
| 2009/0318090 A1* | 12/2009 | Flordelis et al. | 455/67.13 |
| 2010/0323714 A1* | 12/2010 | Schmidt et al. | 455/456.1 |

FOREIGN PATENT DOCUMENTS

| | | |
|---|---|---|
| CN | 1710986 A | 12/2005 |
| EP | 1 909 523 A1 | 4/2008 |
| EP | 1 986 347 A1 | 10/2008 |

OTHER PUBLICATIONS

3GPP TS 36.331 V8.6.0 Evolved Universal Terrestrial Radio Access (E-UTRA) Radio Resource Control (RRC), Jun. 2009.
3GPP TS 36.321 V8.6.0 Evolved Universal Terrestrial Radio Access (E-UTRA) Medium Access Control (MAC) protocol specification, Jun. 2009.
3GPP TS 36.300 V8.9.0 Evolved Universal Terrestrial Radio Access (E-UTRA) and Evolved Universal Terrestrial Radio Access Network (E-UTRAN); Overall description, Jun. 2009.
ETSI MCC: "Updated Draft Report of 3GPP TSG RAN WG2 meeting #63, Jeju, Korea, Aug. 18-22, 2008", TSG-RAN Working Group 2 meeting #63bis R2-084988, Oct. 18-22, 2008, pp. 1-156, Prague, Czech Republic.
Office action mailed on Nov. 19, 2012 for the China application No. 201010247302.0, filing date Aug. 5, 2010, p. 1-5.

* cited by examiner

*Primary Examiner* — Chi Pham
*Assistant Examiner* — Kouroush Mohebbi
(74) *Attorney, Agent, or Firm* — Winston Hsu; Scott Margo

(57) ABSTRACT

A method of handling system information reception with measurement gap configuration for a mobile device in a wireless communication system is disclosed. The method comprises performing reception of a first system information broadcasted by a network of the wireless communication system, and prioritizing reception of the first system information over utilization of a measurement gap for measurement when the measurement gap overlaps a period for the reception of the first system information, wherein the mobile device is configured with the measurement gap.

15 Claims, 4 Drawing Sheets

METHOD OF HANDLING SYSTEM INFORMATION RECEPTION WITH MEASUREMENT GAP CONFIGURATION AND RELATED COMMUNICATION DEVICE

CROSS REFERENCE TO RELATED APPLICATIONS

This application claims the benefit of U.S. Provisional Application No. 61/231,325, field on Aug. 5, 2009 and entitled "METHOD AND APPARATUS FOR handling the reception system information overlap with configured measurement gap IN A WIRELESS COMMUNICATIONS SYSTEM" the contents of which are incorporated herein in their entirety.

BACKGROUND OF THE INVENTION

1. Field of the Invention

A method utilized in a wireless communication and related communication device are disclosed, and more particularly, to a method of handling system information reception with measurement gap configuration in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In the LTE system, a user equipment (UE) applies a system information acquisition procedure to acquire system information broadcasted by an E-UTRAN upon selecting and upon re-selecting a cell, after handover completion, after entering the E-UTRAN from another radio access technology (RAT), upon receiving a notification that the system information has changed, or upon receiving an indication about the presence of an Earthquake and Tsunami Warning System (ETWS) notification, upon exceeding the maximum validity duration, etc. The system information includes most essential and most frequently transmitted parameters that are needed to acquire other information of a cell for connection establishment (e.g. call establishment).

On the other hand, the UE reports measurement information in accordance with the measurement configuration as provided by the E-UTRAN. The E-UTRAN provides the measurement configuration applicable for the UE in a radio resource control (RRC) connected state by means of dedicated signaling, i.e. using the RRCConnectionReconfiguration message. The measurement configuration includes parameters such as measurement objects, reporting configurations, measurement identities, quantity configurations and measurement gaps, wherein the measurement gaps are periods that the UE may use to perform measurements, i.e. no uplink and downlink transmissions are scheduled. The parameters of the measurement configuration have been defined in a RRC specification document 3GPP TS 36.331, so it is not given herein.

However, due to unclear specification for system information reception with measurement gap configuration in the LTE system, several scenarios are described as follows.

In the first scenario, the UE may receive a system information change notification from the network when the UE is in the RRC connected state and is configured with a measurement gap. Thus, a chance that reception of system information is intervened by the measurement gap may occur. However, the LTE system does not clearly define how the UE shall deal with this situation. In this situation, the UE may not perform system information reception due to the measurement gap. Thus, the UE may use previously received system information, thereby affecting UE performance.

In the second scenario, for important system informations (or "required"), e.g. MasterInformationBlock (MIB), SystemInformationBlockType1 (SIB1), SystemInformationBlockType2 (SIB2), (or SIB8 if code division multiple access (CDMA) 2000 is supported), if the reception of required system information is intervened by the measurement gap, the UE is not allowed to access the cell before these required system information are received. If the reception of a MIB is intervened, the UE needs to wait another 10 ms for the next MIB, 20 ms for SIB1, and for SIB2. Moreover, the UE may need to wait at least 80 ms depending on the system information periodicity (SI-periodicity). The actual delay may be the combination of above since more than one system information reception can be intervened, and thereby the total delay can be extremely long. In other words, the cell access may be delayed for a long time when the reception of the required system information is delayed. Thus, the UE may enter a RRC idle state, and release the connection.

In the third scenario, an eNB is responsible to configure measurement gaps for the UE. Due to a great number of UEs under the eNB, the eNB cannot schedule all UEs specific measurement gaps to avoid system information reception of the UE. In addition, scheduling of the measurement gaps for avoiding the system information reception for the UEs is a heavy burden for the eNB. Therefore, a collision between system information reception and measurement gap configuration occurs.

SUMMARY OF THE INVENTION

A method of handling system information reception with measurement gap configuration for a mobile device in a wireless communication system is disclosed. The method comprises performing reception of a first system information broadcasted by a network of the wireless communication system, and prioritizing reception of the first system information over utilization of a measurement gap for measurement when the measurement gap overlaps a period for the reception of the first system information, wherein the mobile device is configured with the measurement gap.

A communication device of a wireless communication system for handling system information reception with measurement gap configuration is disclosed. The communication device comprises means for performing reception of a first system information broadcasted by a network of the wireless communication system, and means for prioritizing reception of the first system information over utilization of a measurement gap for measurement when the measurement gap overlaps a period for the reception of the first system information, wherein the communication device is configured with the measurement gap.

A communication device of a wireless communication system for handling system information reception with measurement gap configuration is disclosed. The communication device comprises a storage unit for storing program code corresponding to a process, and a processing means coupled to the storage unit, for processing the program code to execute the process, wherein the process comprises performing reception of a first system information broadcasted by a network of the wireless communication system, and prioritizing reception of the first system information over utilization of a measurement gap for measurement when the measurement gap overlaps a period for the reception of the first system information, wherein the communication device is configured with the measurement gap.

These and other objectives of the present disclosure will no doubt become obvious to those of ordinary skill in the art after reading the following detailed description of the examples that are illustrated in the various figures and drawings.

DETAILED DESCRIPTION

Figure 1:
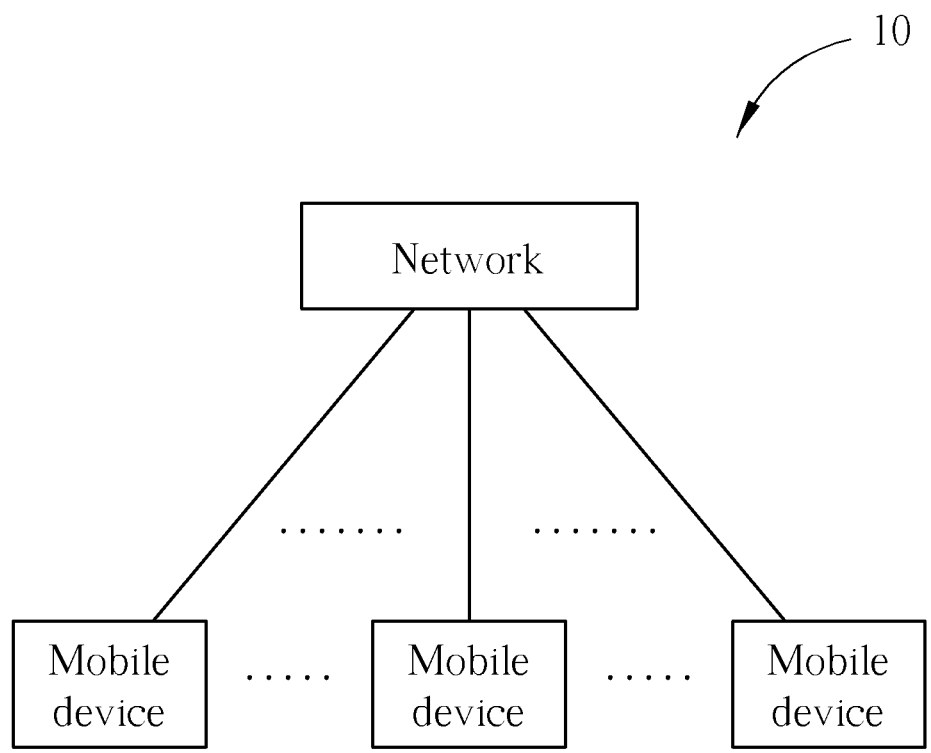
FIG. 1 illustrates a schematic diagram of an exemplary wireless communication system.

Please refer to FIG. 1, which illustrates a schematic diagram of an exemplary wireless communication system 10. Briefly, the wireless communication system 10 is composed of a network and a plurality of mobile devices. The wireless communication system 10 can be an LTE (long-term evolution) system or any other similar network system. In the LTE system, the network can be referred as a EUTRAN (evolved-UTRAN) comprising a plurality of eNBs (e.g. base stations) or a core network entity (e.g. Mobility Management Entity called MME), whereas the mobile devices are referred as to user equipments (UEs). The UEs can be devices such as mobile phones, computer systems, etc. This terminology will be used throughout the application for ease of reference. However, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
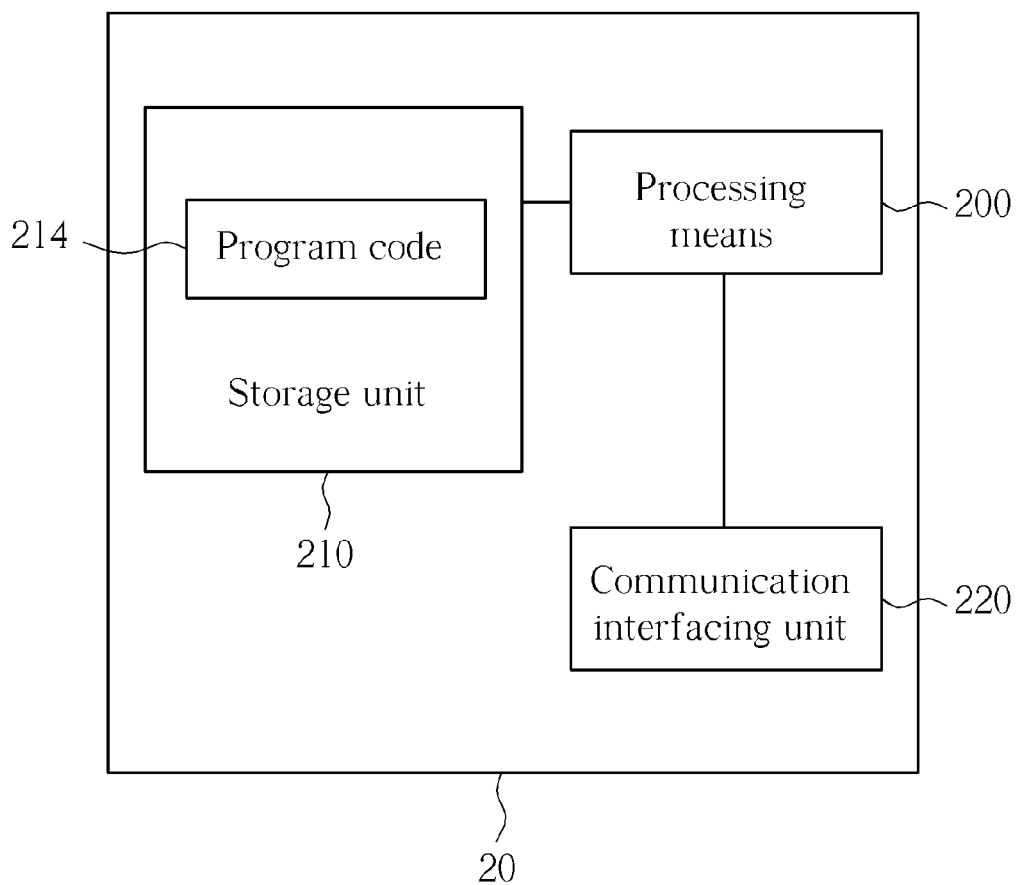
FIG. 2 illustrates a schematic diagram of an exemplary communication device.

FIG. 2 illustrates a schematic diagram of an exemplary communication device 20. The communication device 20 can be the mobile device shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
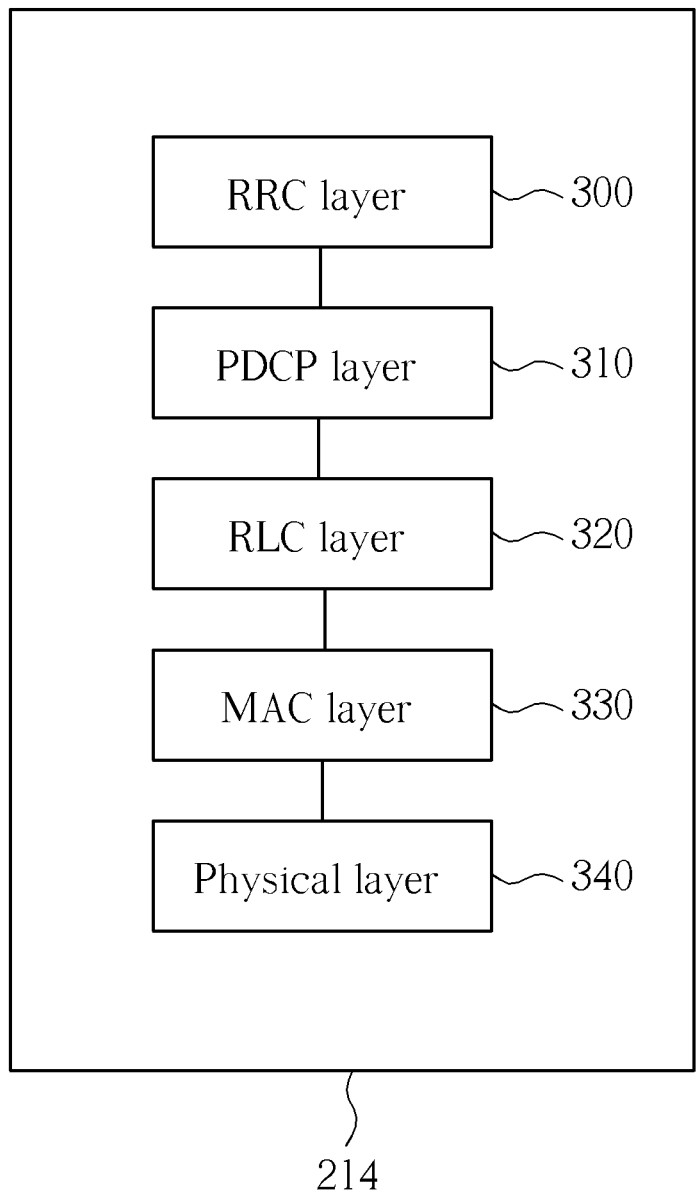
FIG. 3 illustrates a schematic diagram of communication protocol layers for an exemplary communication system.

Please refer to FIG. 3, which illustrates a schematic diagram of communication protocol layers for the LTE system. The behaviors of some of the protocol layers may be defined in the program code 214 and executed by the processing means 200. The protocol layers from top to bottom are a radio resource control (RRC) layer 300, a packet data convergence protocol (PDCP) layer 310, a radio link control (RLC) layer 320, a medium access control (MAC) layer 330 and a physical (PHY) layer 340. The RRC layer 300 is used for performing broadcast, paging, RRC connection management, measurement reporting and control, and radio bearer (RB) control responsible for generating or releasing radio bearers (RBs). In addition, the RRC layer includes a RRC_CONNECTED state and a RRC_IDLE state.

Figure 4:
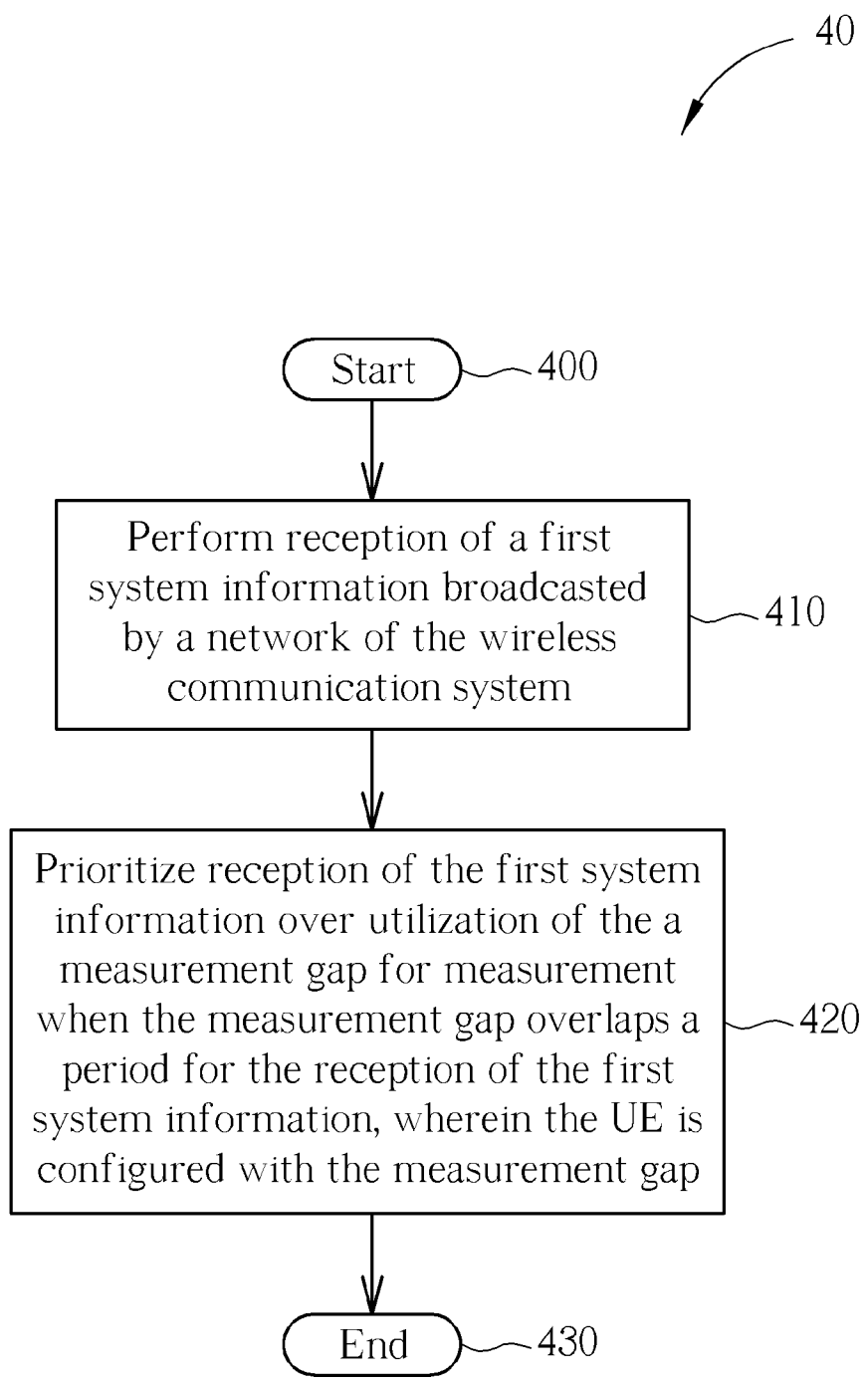
FIG. 4 is a flowchart of an exemplary process.

Please refer to FIG. 4, which illustrates a flowchart of an exemplary process 40. The process 40 is utilized in a UE as the mobile device of FIG. 1. The process 40 may be compiled into the program code 214 and includes the following steps:

Step 400: Start.

Step 410: Perform reception of a first system information broadcasted by a network of the wireless communication system.

Step 420: Prioritize reception of the first system information over utilization of a measurement gap for measurement when the measurement gap overlaps a period for the reception of the first system information, wherein the UE is configured with the measurement gap.

Step 430: End.

According to the process 40, the UE prioritizes reception of the first system information over the utilization of the measurement gap when the UE performs reception of the first system information and has been configured the measurement gap. In other words, the UE performs the system information reception first, and then perform the measurement within the measurement gap, thereby avoiding reception of important system information delay.

Please note that, the first system information may include MasterInformationBlock (MIB), SystemInformationBlockType1 (SIB1), and SystemInformationBlockType2 (SIB2). In addition, the first system information may include MIB, SIB1, SIB2, and SystemInformationBlockType8 (SIB8) if the UE supports the code division multiple access (CDMA2000).

Take an example based on the process 40. The UE performs system information reception when the UE in the RRC_CONNECTED state receives a system information change notification, or a valid time of the system information is expired. The UE performs the system information reception via a system information acquisition procedure. The network may configure the UE a measurement gap for measurement (e.g. an inter-frequency measurement or an inter-RAT measurement), which the measurement gap overlaps the period of system information reception. In this situation, the UE continuously performs the system information acquisition procedure to obtain required system information, such as MIB, SIB1, and SIB2. Since reception of the MIB, SIB1 and SIB2 is not intervened by the measurement gap, the UE can successfully access a cell, and does not enter the RRC_IDLE state which may decrease throughput of the UE. Therefore, system information reception delay and cell access delay can be avoided.

On the other hand, for other system information such as SIB3-SIB11, the UE may prioritize the utilization of the measurement gap over reception of the SIB3-SIB11 when the measurement gap overlaps the period for reception of SIB3-SIB11. For example, the UE uses the measurement gap for measurement, and then performs reception of the SIB3-SIB11. Alternatively, the UE may prioritize the reception of the SIB3-SIB11 over the utilization of the measurement gap. That is, the UE performs reception of the SIB3-SIB11, and then performs the measurement.

Based on the process 40, how the UE shall deal with the collision between the period of system information reception and the measurement gap is clearly defined. Therefore, network scheduling burden of measurement gaps for UEs is relieved.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary method and means are provided to handle the system information reception with the measurement gap configuration.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of handling system information reception with measurement gap configuration for a mobile device in a wireless communication system, the method comprising:
performing reception of a first system information broadcasted by a network of the wireless communication system, wherein the network is a serving cell for the mobile device; and
prioritizing reception of the first system information over utilization of a measurement gap for measurement when the measurement gap overlaps a period for the reception of the first system information, to perform the reception of the first system information instead of performing the utilization of the measurement gap for measurement, wherein the mobile device is configured with the measurement gap by the network.

2. The method of claim 1, wherein the first system information includes MasterinformationBlock (MIB), SystemInformationBlockType1 (SIB1) and SystemInformationBlockType2 (SIB2).

3. The method of claim 2, further comprising:
prioritizing the utilization of the measurement gap over reception of a second system information excluding the MIB, SIB1, and SIB2 when the measurement gap overlaps a period for the reception of the second system information.

4. The method of claim 2, further comprising:
prioritizing the reception of the second system information over the utilization of the measurement gap when the measurement gap overlaps a period for the reception of the second system information.

5. The method of claim 1, further comprising:
receiving a system information change notification message from the network for triggering the reception of the first system information.

6. A communication device of a wireless communication system for handling system information reception with measurement gap configuration, the communication device comprising:
means for performing reception of a first system information broadcasted by a network of the wireless communication system, wherein the network is a serving cell for the communication device; and
means for prioritizing reception of the first system information over utilization of a measurement gap for measurement when the measurement gap overlaps a period for the reception of the first system information, to perform the reception of the first system information instead of performing the utilization of the measurement gap for measurement, wherein the communication device is configured with the measurement gap by the network.

7. The communication device of claim 6, wherein the first system information includes MasterinformationBlock (MIB), SystemInformationBlockType1 (SIB1) and SystemInformationBlockType2 (SIB2).

8. The communication device of claim 7, further comprising:
means for prioritizing the utilization of the measurement gap over reception of a second system information excluding the MIB, SIB1, and SIB2 when the measurement gap overlaps a period for the reception of the second system information.

9. The communication device of claim 7, further comprising:
means for prioritizing the reception of the second system information over the utilization of the measurement gap when the measurement gap overlaps a period for the reception of the second system information.

10. The communication device of claim 6, further comprising:
means for receiving a system information change notification message from the network for triggering the reception of the first system information.

11. A communication device of a wireless communication system for handling system information reception with measurement gap configuration, the communication device comprising:
a storage unit for storing program code corresponding to a process; and
a processing means coupled to the storage unit, for processing the program code to execute the process;
wherein the process comprises:
performing reception of a first system information broadcasted by a network of the wireless communication system, wherein the network is a serving cell for the communication device; and
prioritizing reception of the first system information over utilization of a measurement gap for measurement when the measurement gap overlaps a period for the reception of the first system information, to perform the reception of the first system information instead of performing the utilization of the measurement gap for measurement, wherein the communication device is configured with the measurement gap by the network.

12. The communication device of claim 11, wherein the first system information includes MasterinformationBlock (MIB), SystemInformationBlockType1 (SIB1) and SystemInformationBlockType2 (SIB2).

13. The communication device of claim 12, wherein the process further comprises:
prioritizing the utilization of the measurement gap over reception of a second system information excluding the MIB, SIB1, and SIB2 when the measurement gap overlaps a period for the reception of the second system information.

14. The communication device of claim 12, wherein the process further comprises:
prioritizing the reception of the second system information over the utilization of the measurement gap when the measurement gap overlaps a period for the reception of the second system information.

15. The communication device of claim 11, wherein the process further comprises:
 receiving a system information change notification message from the network for triggering the reception of the first system information.

\* \* \* \* \*

UNITED STATES PATENT AND TRADEMARK OFFICE
CERTIFICATE OF CORRECTION

PATENT NO. : 8,666,389 B2  
APPLICATION NO. : 12/849818  
DATED : March 4, 2014  
INVENTOR(S) : Chia-Chun Hsu Page 1 of 1

It is certified that error appears in the above-identified patent and that said Letters Patent is hereby corrected as shown below:

On the title page, item (73), correct the residence of the assignee from "Taouan County" to --Taoyuan County--.

Signed and Sealed this
Tenth Day of June, 2014

Michelle K. Lee
*Deputy Director of the United States Patent and Trademark Office*